United States Patent
Cervi et al.

(10) Patent No.: US 12,280,968 B2
(45) Date of Patent: Apr. 22, 2025

(54) DEPALLETISING SYSTEM AND METHOD

(71) Applicant: CLEVERTECH S.p.A., Cadelbosco di Sopra (IT)

(72) Inventors: Simone Cervi, Sant'Ilario d'Enza (IT); Alberto Soprani, Quattro Castella (IT)

(73) Assignee: CLEVERTECH S.p.A., Cadelbosco di Sopra (IT)

( * ) Notice: Subject to any disclaimer, the term of this patent is extended or adjusted under 35 U.S.C. 154(b) by 0 days.

(21) Appl. No.: 18/509,118

(22) Filed: Nov. 14, 2023

(65) Prior Publication Data

US 2024/0174463 A1 May 30, 2024

(30) Foreign Application Priority Data

Nov. 28, 2022 (IT) .................. 102022000024504

(51) Int. Cl.
*B65G 59/02* (2006.01)
*B65G 59/04* (2006.01)
*B65G 61/00* (2006.01)

(52) U.S. Cl.
CPC ........... *B65G 59/023* (2013.01); *B65G 59/04* (2013.01); *B65G 61/00* (2013.01)

(58) Field of Classification Search
CPC ........ B65G 59/04; B65G 61/00; B65G 47/90; B65G 47/91; B65G 59/023; B25J 15/0616; B25J 11/0055; B25J 15/0066; B65B 41/06; B65B 43/145; B65B 69/0025; B65B 27/086
See application file for complete search history.

(56) References Cited

U.S. PATENT DOCUMENTS

| | | | | |
|---|---|---|---|---|
| 4,592,692 A | * | 6/1986 | Suizu | B65G 61/00 414/792.8 |
| 4,838,751 A | * | 6/1989 | Hanaya | B65B 69/0025 414/412 |
| 4,995,784 A | * | 2/1991 | Boisseau | B65B 69/0025 414/412 |
| 5,141,274 A | * | 8/1992 | Hayden | B65G 61/00 414/789.5 |
| 5,156,516 A | * | 10/1992 | Boisseau | B65B 69/0025 414/412 |

(Continued)

FOREIGN PATENT DOCUMENTS

| | | | |
|---|---|---|---|
| CN | 105711898 A | * | 6/2016 |
| CN | 106672620 A | | 5/2017 |

(Continued)

OTHER PUBLICATIONS

Search Report and Written Opinion, as issued in connection with Italian Patent Application No. 102022000024504, dated Jun. 6, 2023.

*Primary Examiner* — Gregory W Adams
(74) *Attorney, Agent, or Firm* — Maschoff Brennan (57) ABSTRACT

A method for depalletising a ream of cartons wrapped by a strap. The method may include collecting, by a robot gripping head, the ream of cartons placed on a pallet. Collecting the ream may include exerting a suction force on the ream by one or more suction mouths. The method may also include moving a first arm and a second arm to position the first arm and the second arm below the ream and retain the ream in a positioning zone obtained in the head.

9 Claims, 8 Drawing Sheets

(56) References Cited

U.S. PATENT DOCUMENTS

| | | | | |
|---|---|---|---|---|
| 5,199,845 | A * | 4/1993 | Hirashima | B65G 47/90 |
| | | | | 414/744.1 |
| 5,564,893 | A * | 10/1996 | Tacchi | B65G 47/902 |
| | | | | 414/797 |
| 5,970,834 | A * | 10/1999 | Garofano | B65B 43/145 |
| | | | | 414/907 |
| 6,513,303 | B2 * | 2/2003 | Neri | B65B 27/086 |
| | | | | 53/399 |
| 7,861,862 | B2 * | 1/2011 | Carrigan | B65B 27/086 |
| | | | | 206/499 |
| 8,414,042 | B2 * | 4/2013 | Landes | B65G 47/90 |
| | | | | 294/67.31 |
| 8,622,685 | B2 * | 1/2014 | Van Schijndel | B65G 47/90 |
| | | | | 414/789.9 |
| 9,809,338 | B2 * | 11/2017 | Gautheron | B65H 5/006 |
| 10,040,203 | B2 * | 8/2018 | Ochiishi | B25J 9/123 |
| 10,556,338 | B1 * | 2/2020 | Marchese | B25J 15/0475 |
| 10,583,568 | B2 * | 3/2020 | Tanahashi | B25J 15/06 |
| 10,710,822 | B2 * | 7/2020 | Tommesani | B65G 59/04 |
| 2003/0123962 | A1 | 7/2003 | Mikulic et al. | |
| 2011/0076126 | A1 * | 3/2011 | Pierson | B65G 57/06 |
| | | | | 414/788.1 |
| 2019/0077615 | A1 * | 3/2019 | Tommesani | B65G 59/04 |
| 2021/0032050 | A1 * | 2/2021 | Hayes | B65G 47/90 |
| 2021/0291384 | A1 * | 9/2021 | Chintalapalli Patta | |
| | | | | B25J 15/106 |

FOREIGN PATENT DOCUMENTS

| | | | | |
|---|---|---|---|---|
| CN | 110817459 A | * | 2/2020 | B65G 47/90 |
| EP | 0350372 A2 | | 1/1990 | |
| EP | 3889055 A1 | | 10/2021 | |
| FR | 3060547 A1 | | 6/2018 | |

* cited by examiner

DEPALLETISING SYSTEM AND METHOD

FIELD

The present invention relates to a system and method for depalletising reams of cartons wrapped by a strap.

BACKGROUND

Systems for depalletising objects are known comprising a multi-axis robot comprising a gripping head provided with suction mouth. Once positioned on the ream, the suction mouths create a vacuum which allows the ream to be constrained and then moved. The ream is then removed from the pallet and positioned where desired.

SUMMARY

A method for depalletising a ream of cartons wrapped by a strap. The method may include collecting, by a robot gripping head, the ream of cartons placed on a pallet. Collecting the ream may include exerting a suction force on the ream by one or more suction mouths. The method may also include moving a first arm and a second arm to position the first arm and the second arm below the ream and retain the ream in a positioning zone obtained in the head.

BRIEF DESCRIPTION OF THE DRAWINGS

Further features and advantages of the present invention will become more apparent from the indicative and thus non-limiting description of a preferred but not exclusive embodiment of a depalletising method and system, as illustrated in the appended drawings, in which:

FIGS. 8, 9, 11, 13 show in succession steps for the removal of the strap; in FIGS. 9, 11, 13 the ream has been removed to better highlight others;

DESCRIPTION OF EMBODIMENTS

As described, in some systems suction mouths create a vacuum which allows a ream to be constrained and then moved. The ream is then removed from the pallet and positioned where desired.

A drawback of such a solution is that the cartons are objects which have a certain flexibility and can thus bend under their own weight. Furthermore, the suction mouths exert a suction action on the carton placed on the top and not on the others (which therefore remain constrained thanks to the action of the strap which wraps the ream in a central zone). Therefore, the cartons can be folded on the sides, in the zones farthest from the strap, and assume a configuration warped downwards.

In this context, the technical task underlying the present disclosure is to propose a depalletising system and method which obviate the drawbacks in the known art as described above. In particular, it is an object of the present disclosure to provide a depalletising system and method which allow a secure movement of the reams, minimising the risk that cartons may accidentally slip off during transport.

The defined technical task and the specified aims are substantially achieved by a depalletising system and method comprising the technical features set forth in one or more of the appended claims.

In the appended drawings, reference numeral 1 indicates a system for depalletising a ream of cartons wrapped by a strap.

Such a ream comprises a plurality of cartons stacked and wrapped by a strap surrounding the ream in a substantially central zone. Such a strap is closed on itself and contacts an upper surface of the upper carton of the ream, a lower surface of the lower carton of the ream and two opposite lateral sides of the ream. The lateral sides of the ream are given by the overlapping of the cartons of the ream (there is thus a discontinuity between one carton and those stacked thereon).

The system 1 comprises a robot 2 in turn comprising a ream gripping head 3 suitable for collecting such a ream from a pallet. The robot 2 is typically a multi-axis robot.

Typically, the robot 2 has at least 6 independent axes. Suitably, the robot 2 comprises a movable arm, at one end of which the gripping head 3 is positioned.

The head 3 is connected to the arm by means of a rotating wrist. Suitably the arm is rotatable and allows the head 3 to rotate around a horizontal axis.

Figure 3:
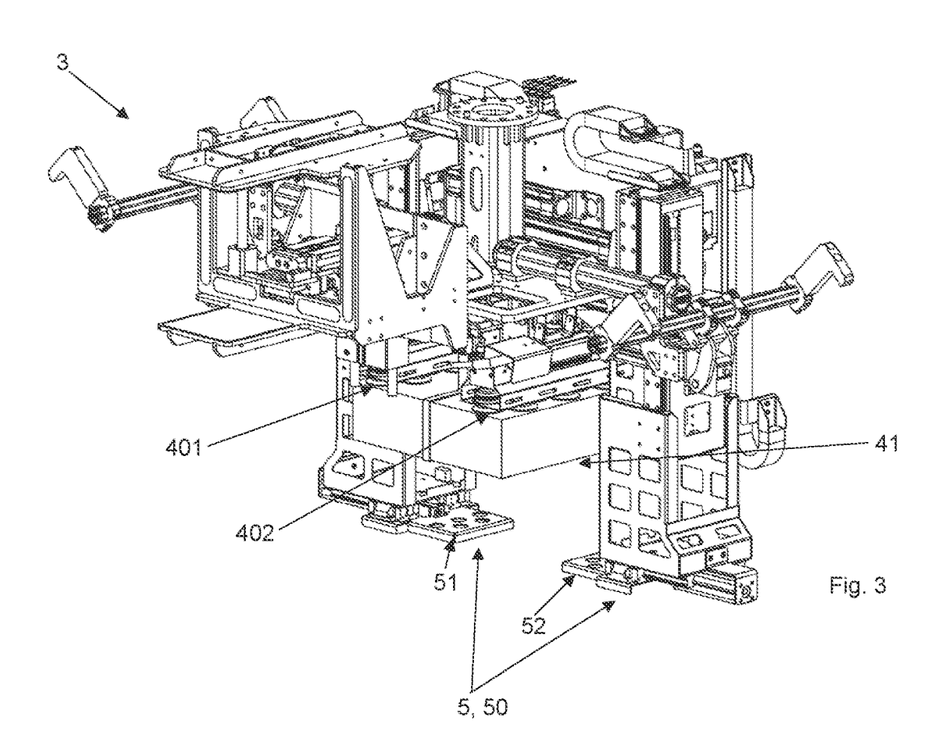

The gripping head 3 comprises a means 4 for collecting the ream, in turn comprising ream suction mouths 40. The mouths 40 are also called "suction cups". As exemplified in FIG. 3, advantageously, the collection means 4 comprises a first grouping 401 of the mouths 40 and a second grouping 402 of the mouths 40. The first and the second grouping 401, 402 are distinct and spaced apart from each other.

The mouths 40 suitably lie on the same plane. The first and the second grouping 401, 402 lie on the same plane and are suitably side by side. Suitably, the gripping head 3 comprises a frame constrained to the robot arm. The frame supports the mouths 40. As better explained below, other devices associated with the head 3 are also constrained to the frame. The system 1, the robot 2, or the head 3 also comprises a depressurisation system operatively connected with the mouths 40. Such a depressurisation system can for example comprise an aspirator.

Figure 6:
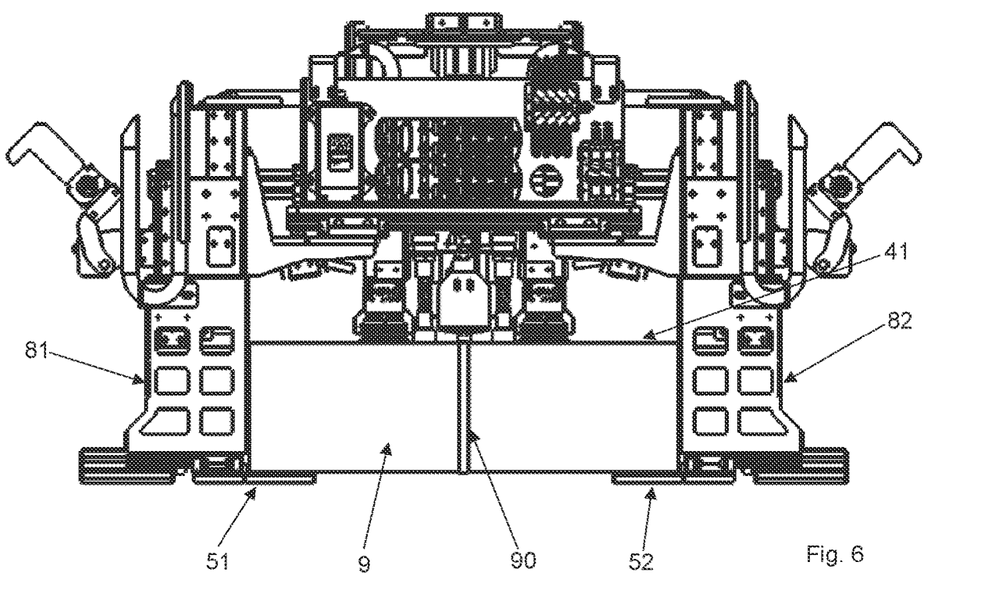

The head 3, in at least one ream transport configuration, also defines a zone 41 for positioning the ream collected by the collection means 4. Such a positioning zone 41 is a concavity for housing the ream during transport (see FIGS. 3 and 6). Suitably the mouths 40 are placed on the top of the positioning zone 41.

The head 3 comprises a first and a second lateral sidewall 81, 82. The first and the second sidewall 81, 82 are movable (for example extendable) along a transverse direction (typically orthogonal) to an imaginary lying plane defined by the mouths 40 (this also in the hypothesis that the arm does not move the head 3; thus there is a movement of the first and the second sidewall 81, 82 with respect to the frame of the head 3). The first and the second lateral sidewall 81, 82 lie on opposite sides of the head 3. The first sidewall 81 is movable between a raised position (see for example FIG. 4) and a lowered position (see for example FIG. 5) with respect to the mouths 40. The raised and lowered position must be evaluated with respect to a position of the head 3 in which the mouths 40 face downwards. In the lowered position, the first sidewall 81 projects below the mouths 40. Passing from the raised to the lowered position, the first sidewall 81 crosses the imaginary lying plane from the mouths 40. What is described for the first sidewall 81 can also be repeated for the second sidewall 82. Suitably, the first and the second sidewall 81, 82 can be mutually approached and distanced. Suitably, the first and/or the second sidewall 81, 82 can be approached to allow the compaction of the ream. They therefore allow the squaring of the cartons of the ream.

In fact, the first and the second sidewall 81, 82 exert an action of confining the ream. Their function is not that of retaining the ream by lateral compression. Thus, ream containment sidewalls can be defined and help to identify the positioning zone 41.

The system 1 comprises ream retention means 5. The retention means 5 comprises gripping arms 50 (suitably retractable) movable between a first resting position (see for example FIG. 4) and a second operating position (see for example FIG. 6) in which they project below the positioning zone 41 and retain the ream from below. The arms 50 extend from an end (from the bottom) of the first and the second lateral sidewall 81, 82. Suitably the arms 50 comprise a first and a second arm 51, 52.

Suitably, the head 3 moves one ream at a time.

Suitably, the first arm 51 is associated with the first sidewall 81. The first arm 51 is movable with respect to the first sidewall 81 (while remaining constrained thereto).

Figure 7:
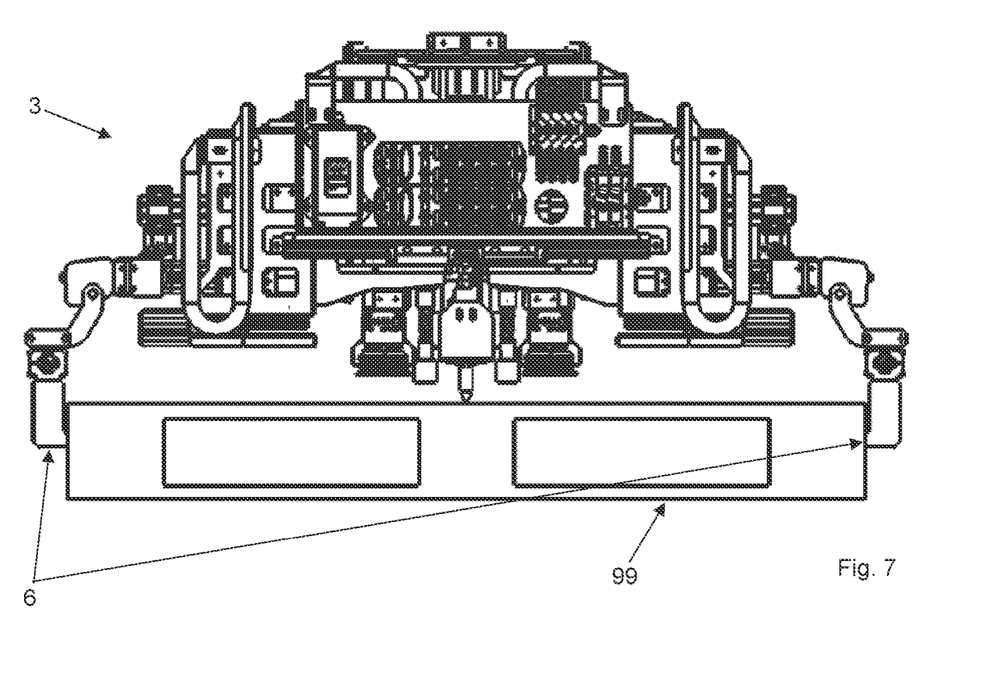
FIG. 7 shows the removal of a pallet with a method according to the present disclosure.
Figure 8:
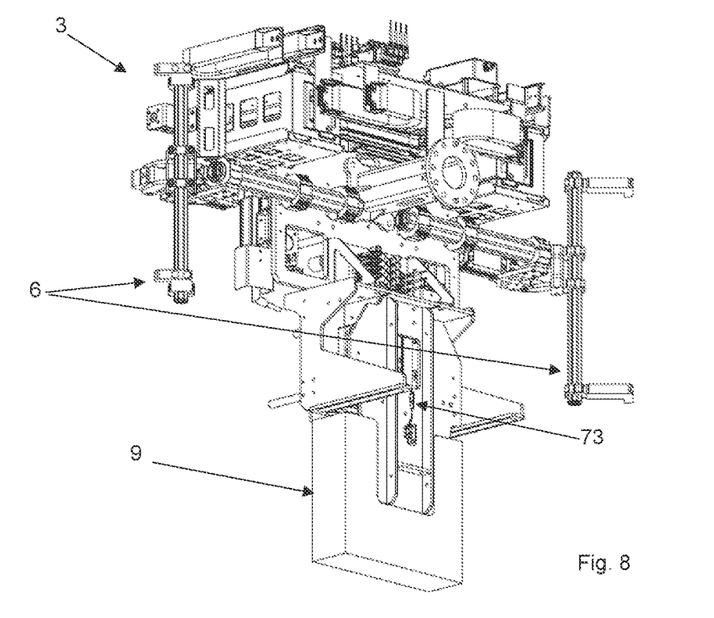
Figure 9:
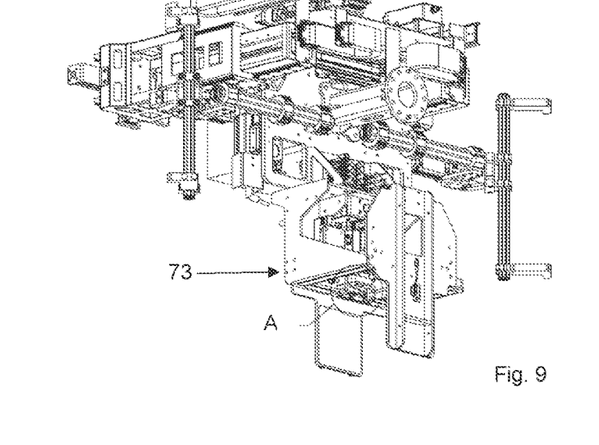
Figure 10:
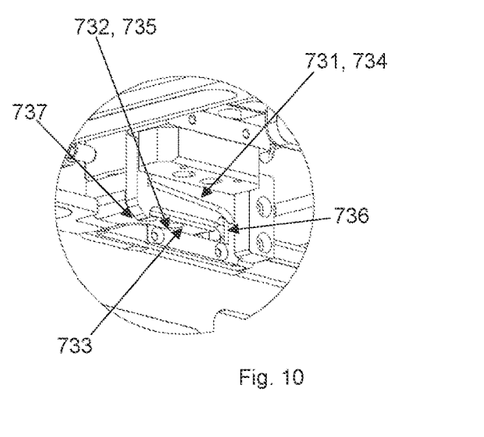
FIGS. 10, 12, 14 respectively show enlargements of details A, B, C of FIGS. 9, 11 13.
Figure 11:
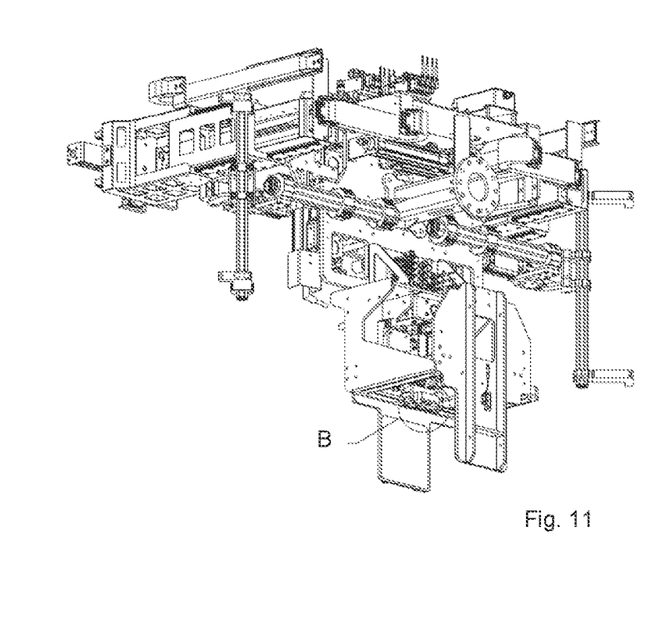
Figure 12:
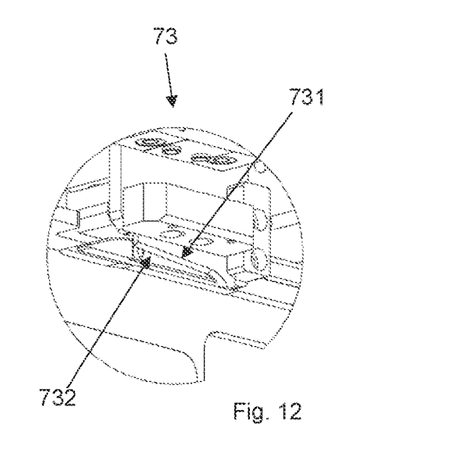
Figure 13:
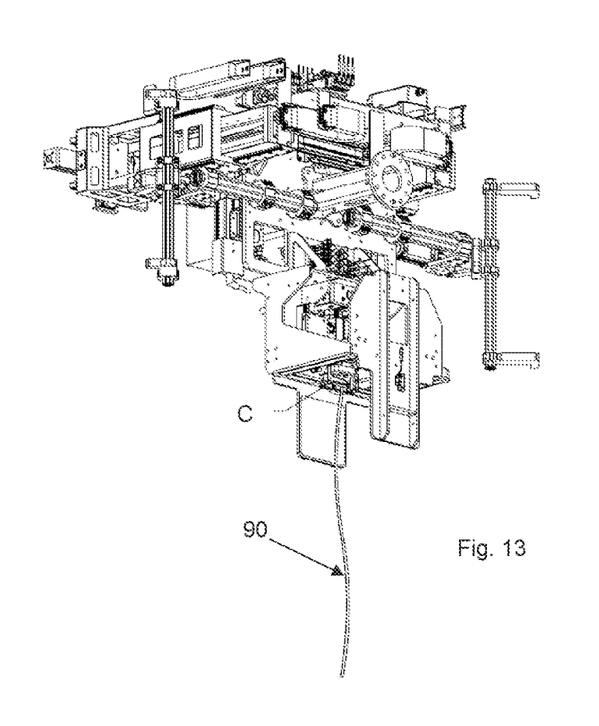
Figure 14:
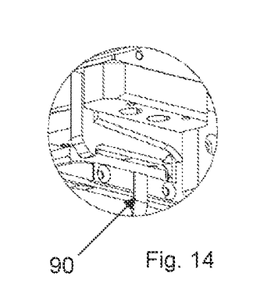
Figure 15:
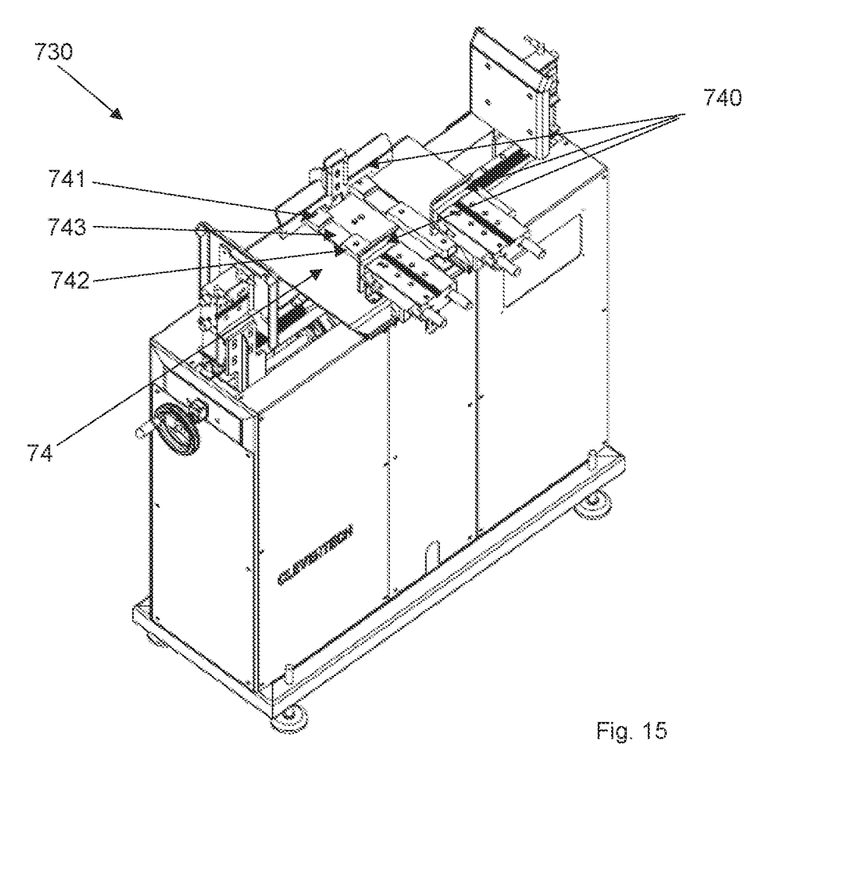
FIGS. 15 and 16 show two details of the depalletising system according to the present disclosure.
Figure 16:
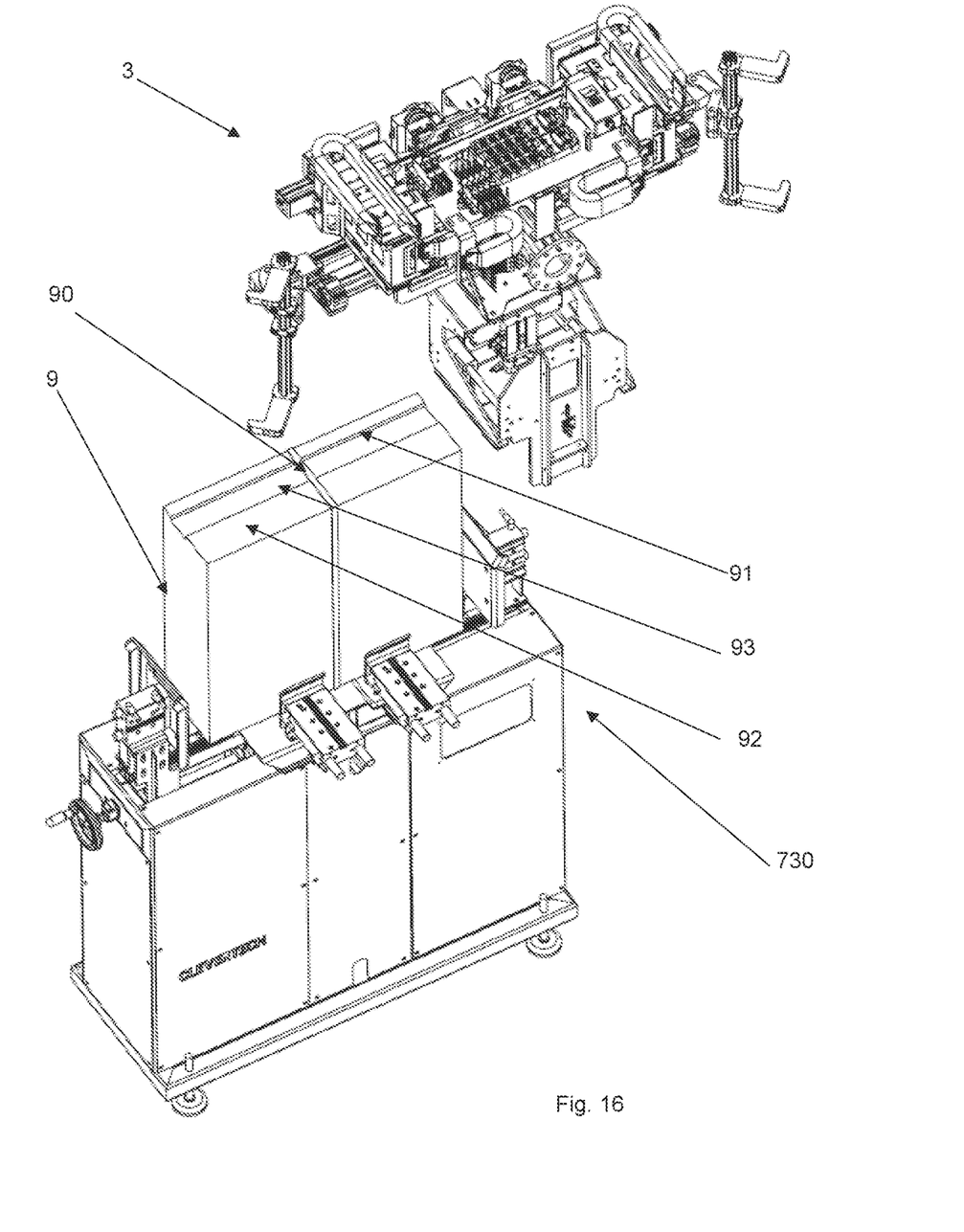

In particular, the first arm 51 in the second position projects from the first sidewall 81 to obstruct the positioning zone 41 below. The first arm 51 projects from an end (from the bottom) of the first sidewall 81. Suitably, the second arm 52 is associated with the second sidewall 82. Suitably, the second arm 52 is movable with respect to the second sidewall 82 (while remaining constrained thereto). In particular, the second arm 52 in the second position projects from the second sidewall 82 to obstruct the positioning zone 41 below. The second arm 52 projects from an end (from the bottom) of the second sidewall 82. In the second operating position the first and the second arm 51, 52 are mutually closer than in the first operating position. Suitably, the first and second arm 51, 52 are retention blades. Suitably, the gripping head 3 is multifunction. The head 3 in particular can also comprise a system 6 for gripping and removing a pallet on which the ream is placed. Such a gripping system 6 comprises two lateral jaws 60. Such jaws 60 are movable between a disengaged configuration (see for example FIG. 4) and an engaged configuration (see for example FIG. 7). To pass from the engaged configuration to the disengaged one and vice versa, the jaws 60 are tiltable. The two jaws 60 project cantilevered on opposite sides of the head 3. They are intended to grasp two opposite sides of the pallet.

The head 3 suitably comprises a vision system 70 for centring the head 3 on the ream. Suitably the vision system 70 comprises a camera and an electronic unit which controls the robot 2 as a function of the input data from the vision system 70.

Figure 5:
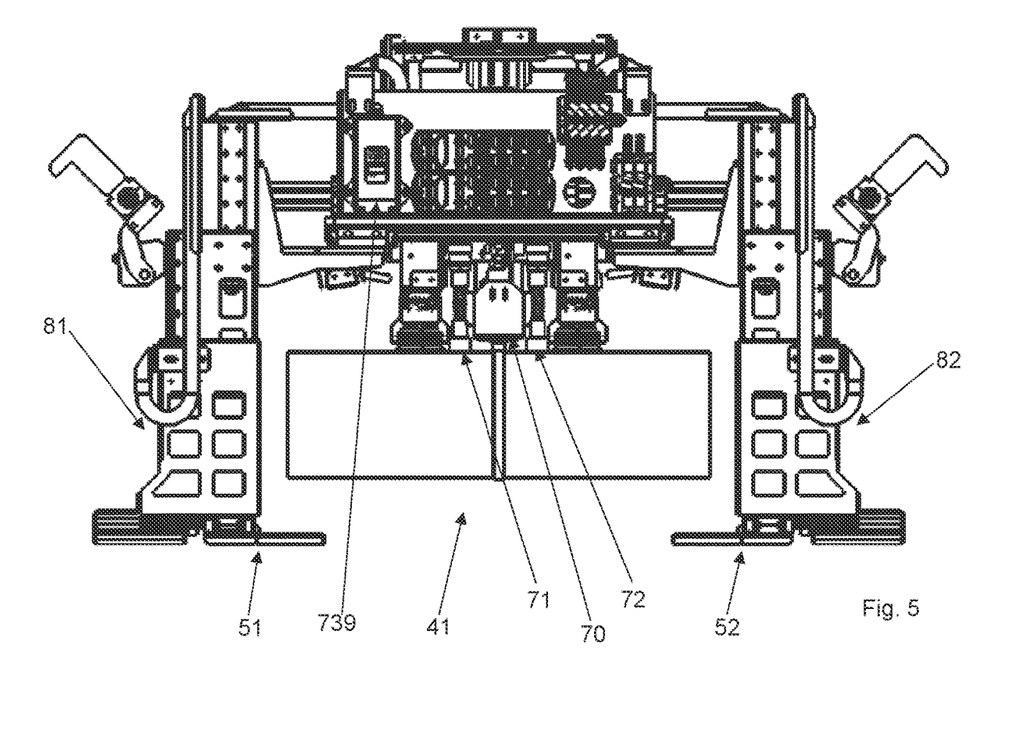

Suitably the head 3 comprises a first and a second probe 71, 72 to determine the vertical contact between the head 3 and the ream (see for example FIG. 5).

Suitably, the first and the second probe 71, 72 are located on the top of the positioning zone 41. Suitably, the first and the second probe 71, 72 are located near the mouths 40. Suitably, the first and the second probe 71, 72 are spaced apart from each other (suitably at least 10 centimetres apart). This allows to provide information on the planarity of the ream.

In a particular constructive solution, the system 1 comprises a cutting system 73 for cutting the strap of the ream. Suitably the cutting system 73 comprises two knives 731, 732 between which the strap can be positioned. The two knives 731, 732 are mutually approachable to cut a section of the strap interposed therebetween.

Suitably the cutting system 73 is placed on the head 3 (as exemplified in the solution of FIGS. 8 to 14). In an alternative solution not illustrated, the cutting system 73 is moved by an additional robot which intervenes on the ream (thus in this case the additional robot intervenes for the strap cutting after the robot 2 has performed the actual depalletisation).

In this regard, the system 1 comprises a cutting station 730 in which the robot 2 releases the ream for which the strap must be removed.

The cutting station 730 comprises a ream support 74 and ream supporting supports 740 in a substantially vertical position. The vertical supports extend upwards starting from the support 74. Suitably the support 74 comprises a first, a second and a third part 741, 742, 743 of the support 74. The first and the second part 741, 742 are located at a higher height than the third part 743. As better explained below, this facilitates the operation of cutting the strap. Suitably the first, the second, the third part 741, 742, 743 are integrally liftable.

Suitably, the frame of the head 3 supports the first and the second lateral sidewall 81, 82 and the mutual approaching/distancing system of the first and the second sidewall 81, 82 (such an approaching/distancing system typically envisages a translation system of the sidewalls 81, 82). The frame of the head 3 also supports the vision system 70 and/or the first and the second probe 71, 72, and/or the cutting system 73 and/or the pallet gripping system 6.

A method for depalletising a ream 9 of cartons wrapped by a strap 90 also constitutes an object of the present disclosure. Such a method is suitably implemented by means of a depalletising system 1 having one or more of the features described above.

Figure 1:
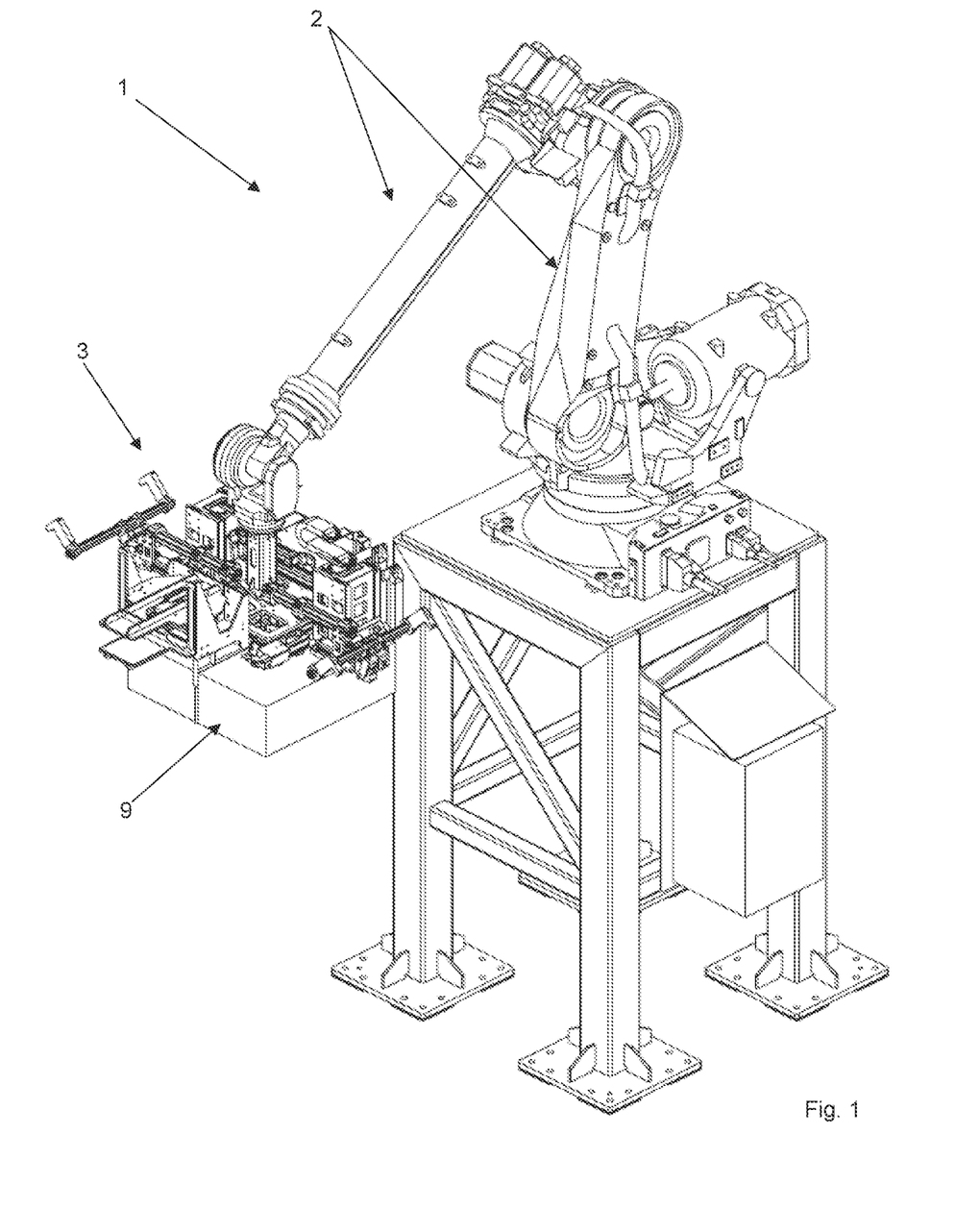
FIG. 1 shows a portion of the depalletising plant according to the present disclosure.
Figure 2:
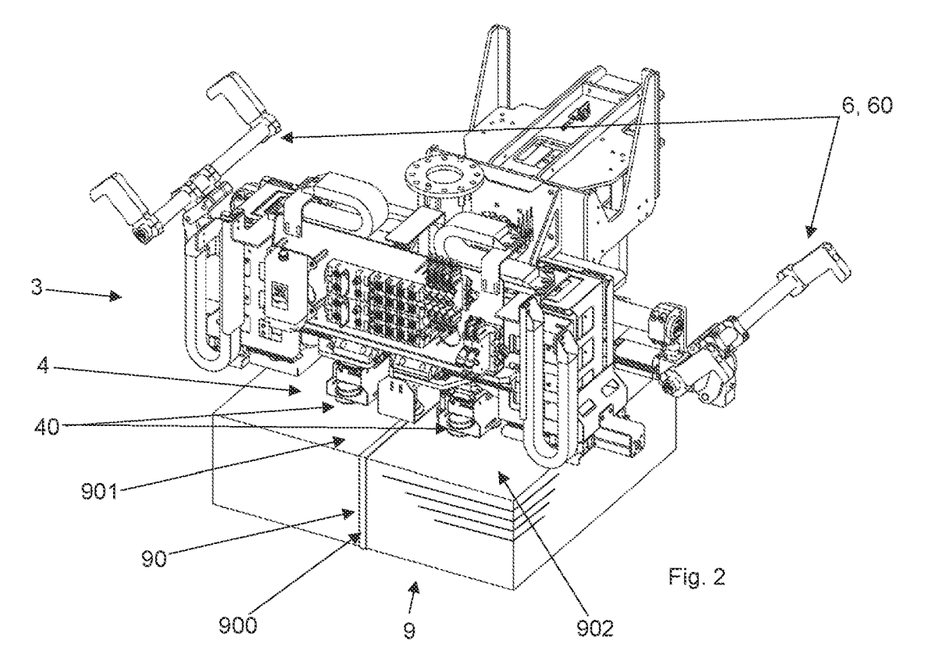
FIGS. 2 and 3 show a detail of the depalletising plant according to the present disclosure.

As explained above, the ream 9 comprises a plurality of cartons stacked and wrapped by a strap 90 surrounding the ream in a substantially central zone. The strap 90 is typically made of plastic material. In FIG. 2, the arrangement of the various cartons belonging to ream 9 is schematically referenced. Such a strap 90 is closed on itself. The strap 90 (when the ream 9 is on the pallet) contacts an upper surface of the upper carton of the ream 9, a lower surface of the lower carton of the ream 9 and two opposite lateral sides of the ream 9. The lateral sides of the ream 9 are given by the overlapping of the cartons of the ream 9.

The method comprises the step of collecting, by means of a gripping head 3 of a robot 2, the ream 9 of cartons. Such a ream 9 is suitably placed on a pallet 99. In particular, there can be a plurality of reams 9 advantageously stacked and/or side by side on the pallet 99. The ream 9 to be collected from the pallet 99 is placed in a zone accessible from above.

Figure 4:
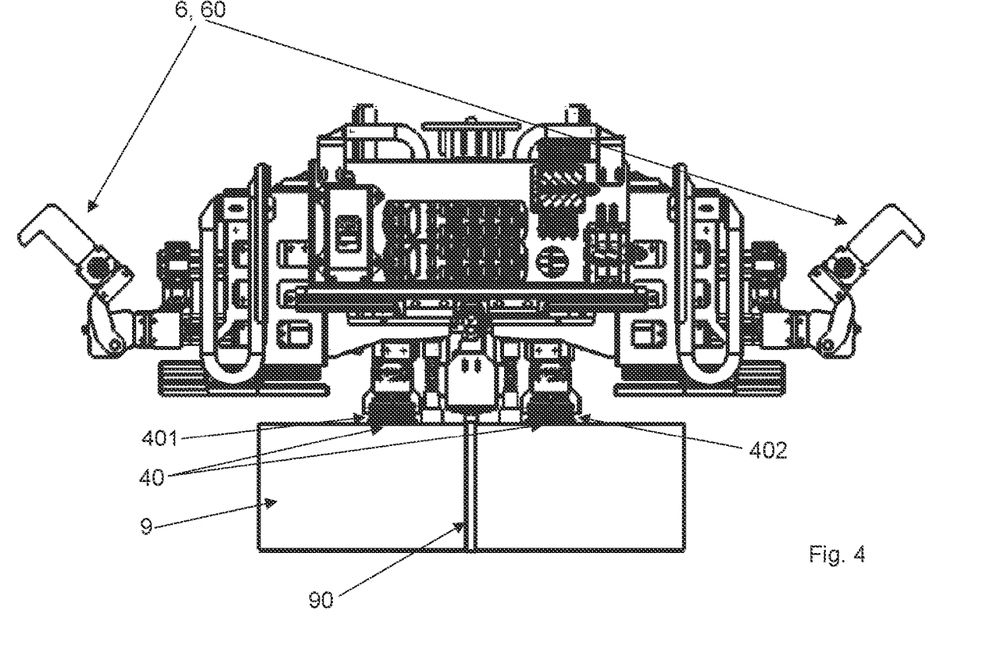
FIGS. 4 to 6 show in succession the collection of the ream with a method according to the present disclosure.

The step of collecting the ream 9 of cartons comprises the step of exerting a suction force on the ream 3 by means of suction mouths 40 (see FIG. 4). Such mouths 40 could be defined as suction modules.

In this regard, the head 3 approaches the ream 9 from above (advantageously this occurs after having measured the distance between the head 3 and the upper surface of the ream; this occurring for example by means of a laser meter 739). Suitably a vision system 70 allows the centring of the head 3 above the ream 9. At least a first and a second probe 71, 72 (spaced apart and suitably lying in the same fictitious horizontal plane) indicate that the head 3 has reached the ream 9 from above.

The step of collecting the ream 9 involves exerting a suction both in a first upper zone 901 of the ream 9 and in a second upper zone 902 of the ream 9. Suitably, the strap 90 is interposed between the first and the second upper zone 901, 902. Therefore, the suction is performed from both sides with respect to the strap 90. This is important to constrain the ream 9 on both sides (with respect to the strap 90). This allows to better constrain the ream 9. Suitably the first probe 71 comes into contact with the first upper zone 901 of the ream 9. Suitably the second probe 72 comes into contact with the second zone 902 of the ream 9. Suitably the first and the second probe 71, 72 come into contact with the ream 9 before the step of collecting the ream 9 begins. The method comprises the steps of moving the arms 50 (suitably retractable) to position them below the ream 9 and retain the ream 9 in a positioning zone 41 on the head 3.

The method comprises a step of lifting the ream 9 from the pallet (meaning from the actual pallet or from the other reams of the pallet). This occurs by lifting the head 3 which, by means of the suction mouths 40, constrains the ream 9. The step of lifting the ream 9 occurs between the step of collecting the ream 9 and the step of moving the arms 50.

The step of moving the arms 50 comprises the step of moving a first and a second lateral sidewall 81, 82 which in turn respectively support the first and the second arm 51, 52.

The step of moving the first and the second sidewall 81, 82 comprises one or more of the following steps:
  lowering the first and the second lateral sidewall 81, 82, positioning them in front of two opposite sides of the ream 9 (see FIG. 5); possibly such a step can be preceded by the step of mutually distancing the first and the second lateral sidewall 81, 82; this allows the subsequent descent without the first and the second sidewall 81, 82 colliding with the ream 9 below;
  mutually approaching the first and the second sidewall 81, 82 until they come into contact with the two opposite sides of the ream 9 facing each other. Suitably, the step of mutually approaching the first and the second sidewall 81, 82 does not envisage them clamping the ream 9 laterally (it is sufficient that they confine the ream 9).

The gripping arms 50 are movable between a first rest position and a second operating position in which they project below the ream 9 (in particular the gripping arms 50 project below the positioning zone 41 and retain the ream 9 from below).

To pass from the first rest position to the second operating position, the gripping arms 50, for at least a section of their stroke, move parallel to a plane in which the suction mouths 40 lie.

Suitably, the step of moving the gripping arms 50 also envisages moving the first arm 51 with respect to the first sidewall 81 and the second arm 52 with respect to the second sidewall 82.

Suitably, the step of moving the gripping arms 50 also envisages lifting the gripping arms 50, after having placed them below the ream 9, to clamp them against a lower portion of the ream 9. This can occur by lifting the first and the second sidewall 81, 82 (see FIG. 6).

The method further comprises the step of removing the strap 90 from the ream 9.

The step of removing the strap 90 involves cutting it (see FIGS. 8, 9, 11, 13 in succession). Suitably, the cut occurs mechanically. In a non-preferred solution, it could occur with heating means. The step of removing the strap 90 from the ream 9 comprises the steps of:
  positioning the ream 9 on a support 74, placing at the top a first section 900 of the strap 90 facing multiple cartons of the ream 9 (the first section 900 overlaps a side of the ream 9 given by the overlapping of multiple cartons); the step of positioning the ream 9 on the support 74 envisages that the robot 2 deposits the ream 9 on the support 74;
  positioning the first section 900 between two knives 731, 732; suitably, such a step envisages inserting the first section 900 by inserting it into an inlet 733; the two knives 731, 732 being on two opposite sides 734, 735 of the inlet 733 and connected along a third side 736; such an inlet 733 having a lateral opening 737 situated in a position opposite the third side 736 for the insertion of the first section 900;
  cutting the strap 90 interposed between the two knives 731, 732.

Suitably the two knives 731, 732 lie on the head 3 of the robot 2. In this case, the robot 2, after depositing the ream 9 on the support 74, cuts the strap 90. In an alternative solution, the two knives 731, 732 could be located on an additional robot separate from the robot 2 (solution not illustrated). In this case, the additional robot intervenes after the robot 2 has placed the ream placed on the support 74.

The step of removing the strap 90 comprises the step of grasping an already-cut piece of the strap 90 and removing the strap 90. Suitably, the step of grasping a piece of the strap 90 occurs by means of an actuator (for example a piston) which compresses the piece of the strap 90 against an abutment.

Suitably the step of cutting the strap comprises the step of moving at least one portion of the support 74. In particular, such a portion of the support 74 is lifted to lift only one part of the cartons of the ream 9 and thus create a space between the cartons of the ream 9 and the strap 90 (but in an alternative solution instead of being lifted it could be lowered). Suitably this occurs so as to facilitate the step of positioning the first section 900 between the two knives 731, 732.

Preferably the step of lifting at least one portion of the support 74 comprises the step of lifting a first and a second part 741, 742 of the support 74, lifting a first and a second group 91, 92 of cartons of the ream and leaving a third group 93 of cartons of the ream 9 at a lower height; the third group 93 being interposed between the first and the second group 91, 92 of cartons; the step of cutting the strap 90 occurs at a section of the strap 90 facing the third group 93 of cartons. Suitably, between the first and the second part 741, 742 of the support 74 there is a third part 743 integral therewith, but which is located at a lower height. Lifting the first and the second part 741, 742, the third part 743 also lifts, which remains at a lower height.

Consequently, it does not position the third group 93 of cartons at the same height as the first and the second group 91, 92 (pushed upwards respectively by the first and the second part 741, 742 of the support 74).

The present disclosure may help to achieve advantages.

Firstly, it makes it possible to allow the stable positioning of the ream during movement. Furthermore, it also allows to speed up the depalletising operation by providing a multi-function head.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A method for depalletising a ream of cartons wrapped by a strap, the method comprising:
    collecting, by a robot gripping head that includes a first lateral sidewall and a second lateral sidewall and one or more suction mouths, the ream of cartons placed on a pallet, the collecting the ream including exerting a suction force on the ream by the one or more suction mouths, the robot gripping head, in at least one ream transport configuration, further defining a positioning zone for positioning the ream collected by the one or more suction mouths;
    moving a first arm and a second arm to position the first arm and the second arm below the ream and retain the ream in the positioning zone obtained in the robot gripping head,
        wherein moving the first arm and the second arm includes moving the first arm with respect to the first lateral sidewall and the second arm with respect to the second lateral sidewall from a first rest position to a second operating position in which the first arm and the second arm both project below the ream and retain the ream from below,
        wherein the first arm is translatable relative to the first lateral sidewall and the first arm, in the second operating position, projects from the first lateral sidewall to obstruct the positioning zone below, and
        the second arm is translatable relative to the second lateral sidewall and the second arm, in the second operating position, projects from the second lateral sidewall to obstruct the positioning zone below; and
    removing the strap from the ream, wherein removing the strap includes:
        positioning the ream on a support by placing at a top a first section of the strap facing multiple cartons of the ream;
        positioning the first section between two knives;
        lifting at least one portion of the support to lift only one part of the cartons of the ream to create a space between the cartons of the ream and the strap in order to facilitate the positioning of the first section between the two knives;
        cutting the strap interposed between the two knives;
        grasping an already-cut piece of the strap; and
        removing the strap.

2. The method according to claim 1, wherein exerting the suction force involves exerting a suction both in a first upper zone of the ream and in a second upper zone of the ream, wherein the strap is interposed between the first upper zone and the second upper zone.

3. The method according to claim 1, further comprising:
    starting to lift the ream from the pallet, wherein lifting the ream occurs after a start of exerting the suction force on the ream and before positioning the first arm and the second arm below the ream.

4. The method according to claim 1, wherein moving the first arm and the second arm includes:
    moving the first lateral sidewall and the second lateral sidewall which in turn respectively support the first arm and the second arm, wherein moving the first and the second lateral sidewalls includes:
    lowering the first and the second lateral sidewalls;
    positioning the first and the second lateral sidewalls in front of two opposite sides of the ream; and mutually approaching the first and the second lateral sidewalls until the first and the second lateral sidewalls come into contact with the two opposite sides of the ream facing each other.

5. The method according to claim 1, wherein the lifting the at least one portion of the support comprises:
    lifting a first part and a second part of the support;
    lifting a first and a second group of cartons of the ream; and
    leaving a third group of cartons of the ream at a lower height, wherein the third group is interposed between the first and the second group of cartons and cutting the strap occurs at a section of the strap facing the third group of cartons.

6. The method according to claim 1, wherein the moving of the first arm and the second arm to lift the first arm and the second arm occurs by lifting the first and the second lateral sidewalls.

7. A system for depalletising a ream of cartons wrapped by a strap, the system comprising:
    a robot comprising a ream gripping head configured to collect a ream from a pallet, the gripping head comprising a means for collecting the ream that includes ream suction mouths,
    wherein the ream gripping head, at least in a ream transport configuration, defines a zone for positioning the ream collected by the means for collecting and the gripping head further includes:
        a system for gripping and removing a pallet on which the ream is placed;
        a vision system for centering the head on the ream;
        a first probe and a second probe to determine a vertical contact between the head and the ream; and
        a system for cutting the strap of the ream; and
    ream retention means that includes gripping arms movable between a first resting position and a second operating position in which the gripping arms project below the positioning zone and retain the ream from below.

8. The system according to claim 7, further comprising a first lateral sidewall and a second lateral sidewall for containing the ream, the first lateral sidewall and the second lateral sidewall being able to be mutually approached and distanced and defining the positioning zone in a space interposed therebetween, the gripping arms extending from a bottom of the first and the second lateral sidewalls.

9. A method for depalletising a ream of cartons wrapped by a strap, the method comprising:
    collecting, by a robot gripping head, the ream of cartons placed on a pallet, the collecting including exerting a suction force on the ream by suction mouths;
    moving one or more arms to position the one or more arms below the ream and to retain the ream in a positioning zone obtained in the robot gripping head;
    removing the strap from the ream, the removing including:
        positioning the ream on a support by placing at a top a first section of the strap facing multiple cartons of the ream;
        lifting at least one portion of said support to lift only one part of the cartons of the ream to create a space between the cartons of the ream and the strap, the lifting including:
            lifting a first and a second part of the support; and
            lifting a first and a second group cartons of the ream and leaving a third group of cartons that is interposed between the first and the second group of cartons of the ream at a lower height;
        after lifting the at least one portion, positioning the first section between two knives, the lifting facilitating the positioning of the first section between the two knives;
        cutting the strap interposed between the two knives at a section of the strap that faces the third group of cartons;
        grasping an already-cut piece of the strap; and
        removing the strap.

* * * * *